United States Patent [19]

Barnum

[11] 3,957,073

[45] May 18, 1976

[54] PRESSURE BALANCING VALVE

[75] Inventor: Thomas G. Barnum, Fox Point, Wis.

[73] Assignee: Bradley Corporation, Menomonee Falls, Wis.

[22] Filed: Dec. 16, 1974

[21] Appl. No.: 533,159

[52] U.S. Cl................................ 137/87; 137/100
[51] Int. Cl.² ........................................ G05D 11/03
[58] Field of Search .............. 137/87, 98, 100, 101, 137/99

[56] References Cited
UNITED STATES PATENTS

| 1,999,740 | 4/1935 | Schmidt | 137/100 X |
| 3,688,790 | 9/1972 | Esten | 137/98 |

FOREIGN PATENTS OR APPLICATIONS

| 666,256 | 2/1952 | United Kingdom | 137/101 |

Primary Examiner—Robert G. Nilson
Attorney, Agent, or Firm—Quarles & Brady

[57] ABSTRACT

A pressure balancing valve has a pair of fluid ducts for hot and cold water, a butterfly type valve is located in each duct, a pressure cavity is provided that is in communication with each duct, and a resilient diaphragm mounted in the cavity converts pressure differential between the ducts into positional displacement of a rod-like pressure plate linkage secured to the butterflies. The butterflies pivot to alter fluid flow in the ducts until substantially equal pressures appear at the outlets of the ducts.

13 Claims, 8 Drawing Figures

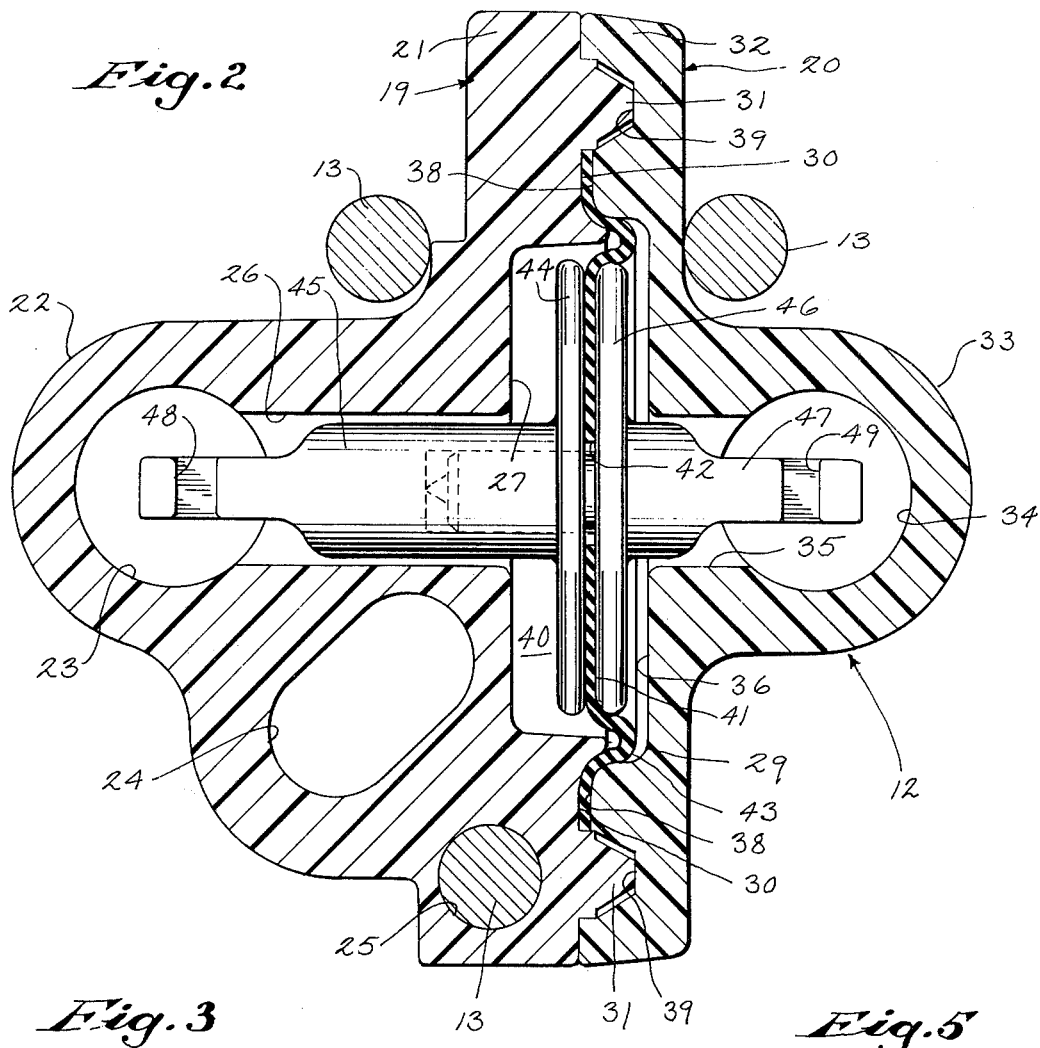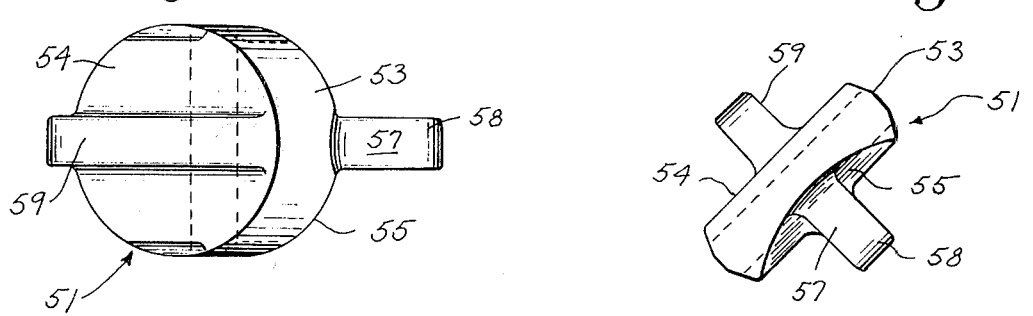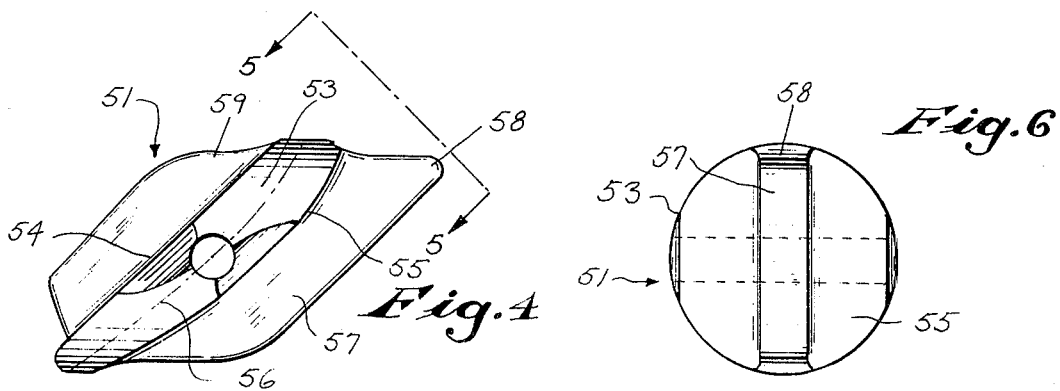

PRESSURE BALANCING VALVE

BACKGROUND OF THE INVENTION

The invention relates to pressure balancing valves as used for plumbing fittings, such as shower and tub control valves.

When operating bathtub spouts and shower heads, an undesirable situation usually arises when the pressure of either the hot or cold water line is sharply reduced or increased, as may occur from simultaneous operation of some other device joined in the same plumbing network, or from some malfunction in the water source itself. Upon such an occurrence, the user of the spout or shower head may be scalded by a sudden drop in the cold water pressure, or conversely distressingly chilled by a cutback in the hot water pressure. By employing a pressure balancing valve in the supply lines, such situations are substantially eliminated by automatically equalizing the water pressures at the outlets of the valve. By regulating the pressures, a preselected temperature of the mixed hot and cold water is maintained at the tub spout or shower head. Also, in the event of complete loss of one or the other water sources, the flow of water will be sufficiently throttled in time to prevent large quantities of untempered water from causing undue discomfort.

One type of pressure equalizing or proportioning valve is the sliding piston type, as disclosed in U.S. Pat. No. 2,200,578 issued to T. C. Mahon on May 14, 1940. Such a valve consists of a body having fluid flow passageways and a piston floating between and intersecting the passageways. An increase in inlet pressure in one passageway will cause an axial sliding displacement of the piston towards the opposite passageway. This increases the rate of fluid flow in one passageway and simultaneously decreases the fluid flow in the opposite passageway, until a condition of equilibrium is attained at which point the outlet pressures in the two passageways are substantially equal. While sliding piston arrangements perform in a generally satisfactory manner, mineral and sediment depositions occur frequently and tend to "freeze" the axial shifting of the piston causing a loss of fluid pressure regulation at the outlets of the valve. When used in a tub-shower application, such imbalance results in discomforting temperature variation and water pressure cutback.

Attempts to alleviate these aforementioned fluctuations have produced a diaphragm actuated type of balancing valve, such as that disclosed in U.S. Pat. No. 3,688,790 issued to H. Esten on Sept. 5, 1972. Constructions of this type feature a body having spaced flow paths interconnected by an intermediate chamber across which a resilient diaphragm extends. Secured transversely to this diaphragm member is a piston rod or valve stem assembly, having radially enlarged head elements which serve to open and close ports in the flow paths. An imbalance of inlet water pressure on one side of the diaphragm will cause it to deflect in the opposite direction and displace the piston rod and valve heads until a state of pressure equalization at the outlets of the valve is reached. Utilization of the diaphragm-sliding piston valve arrangement eliminates somewhat the liming and particle deposition problems formerly encountered in prior valves; however, fluid turbulence in this type of valve can appear and cause overcompensation, diaphragm oscillation, or water hammer, all of which impair a proper balance of the fluid flow rates and severely hamper the stability of the device.

It is desirable to furnish a pressure balancing valve which is self-purging, such that sedimentation problems are substantially alleviated. In addition, a pressure balancing valve should be sensitive, such that it will respond to small pressure variations at the inlets to the valve and effectively check water hammer. In the event of a complete loss of pressure in one of the supply lines, it is desirable characteristic that there be a substantial shutoff in the other line to prevent high flow discharges of only hot or cold water.

From a commercial standpoint, a pressure balancing valve should also be simple and compact in construction, and perform reliably and accurately while requiring a minimun of close manufacturing tolerances.

It is against this background of the art that the present invention has been conceived, and a principal goal of the invention is to provide an improved pressure balancing valve which has greater stability and sensitivity, and fewer operating malfunctions than prior pressure balancing devices.

SUMMARY OF THE INVENTION

The present invention relates to a pressure balancing valve, and more specifically resides in a body formed with two spaced fluid ducts, an intermediate cavity joined with the flow paths to have pressures in the ducts admitted into the cavity, a pressure sensor movably mounted within the intermediate cavity, and a pair of butterfly type valves, each of which is positioned within one of the ducts and in cooperative connection with the pressure sensor.

In the preferred form of the invention, the pressures of fluids entering the fluid ducts are transmitted into the intermediate cavity to opposite sides of a diaphragm forming a part of the pressure sensor. As long as the pressures of the fluids remain substantially fixed, the pressure sensor will maintain a stable position and hold both of the butterfly valves in settings so that the preselected balance of fluids will continue to pass from the outlets of the ducts. Upon a fluctuation in the outlet pressures in either of the fluid ducts, however, the greater inlet pressure will exert itself upon the pressure sensor causing sensor to shift in the opposite direction, opening the butterfly on that side and closing the butterfly on the greater pressure side. Through this adjustment, equalized pressures of the fluids passing through the outlets of the flow paths will be maintained and the resulting mixture temperature of the fluids will remain uniform.

It is a general objective of the invention to provide a pressure balancing valve which effectively maintains equalized pressures of fluids fed to a mixing valve, in order that the mixed output temperature be maintained irrespective of variations in the inlet fluid pressures. This result is attained in part by employing an improved pressure sensor in association with a pair of butterfly type valves. The pressure sensor includes a resilient diaphragm that has an undulation, or sinuous fold that enhances its sensitivity and maintains such sensitivity over a range of positions. A small pressure differential will cause a full stroke of the diaphragm and its associated parts making up the pressure sensor. Thus, inlet pressure differential is translated into positional displacement of the butterfly valves, each of which is pivotably mounted within a fluid duct of the balancing valve.

Sensitive performance of the invention depends in part upon the utilization of the butterfly type valves which are easily positioned from outside the controlled fluid channel, and which can diminish fluid turbulence in the sensing chamber, which is a trouble frequently encountered in former pressure balancing valves. The butterfly valves are also designed to seek a closed position, particularly when they approach the closed position. The fluid forces working on the two butterflies also tend to balance one another, and in addition tend to counterbalance the elastic stresses in the diaphragm. As a result, a small fluid pressure variation may produce a full axial shift of the movable parts of the device. Balanced fluid pressures at the duct outlets of the device are thus obtained which improve regulation of mixture temperature.

A normal butterfly construction, when pivoted at its center, will have a tendency to self-close, but will not close completely because of peripheral edge pressures. The present butterfly has a vane design such that upon a complete loss of pressure in either of the flow paths, which causes the pressure balancing valve to seek complete shutoff in the other flow path, the butterfly in the line being shut down will satisfactorily close to eliminate excessive discharge of only hot or cold water. Upon near closure of the butterfly, there is a line around its periphery that lies in the closest proximity to the inner wall of the valve, and this defines a band of contact. By making this band longer or at an angle of lesser deviation from the flow path on the portion of the butterfly upstream from the point of pivot, a net closing torque may be achieved.

It is a further object of the invention to provide a pressure balancing valve which has improved sensitivity in response to inlet pressure fluctuations to obtain better regulation of water temperature.

Another object is to reduce water hammer and damp oscillations of movement due to fluid surges.

Another object is to furnish a pressure balancing valve which is less susceptible to malfunctions from sedimentation and depositions that may cause parts to stick or otherwise freeze in positions, and in this connection to provide self-purging parts which tend to be washed free from accumulation of deposits.

The foregoing and other objects and advantages of the invention will appear from the following description. In the description, reference is made to the accompanying drawings, which form a part hereof, and in which there is shown by way of illustration and not of limitation a preferred embodiment of the invention. Such embodiment does not represent the full scope of the invention, but rather the invention may be employed in many different embodiments, and reference is made to the claims herein for interpreting the breadth of the invention.

BRIEF DESCRIPTION OF THE DRAWINGS

FIG. 2 is an enlarged sectional view of the pressure balancing valve of FIG. 1 taken in the plane 2—2, indicated in FIG. 1, FIG. 3 is a view of a butterfly vane forming part of the pressure balancing valve looking downward upon the upstream surface of the butterfly, FIG. 4 is a side view in elevation of the butterfly shown in FIG. 3, FIG. 5 is a view of the butterfly taken on the plane 5—5, indicated in FIG. 4, FIG. 6 is a view of the downstream end of the butterfly.

DESCRIPTION OF THE PREFERRED EMBODIMENT

Figure 1:
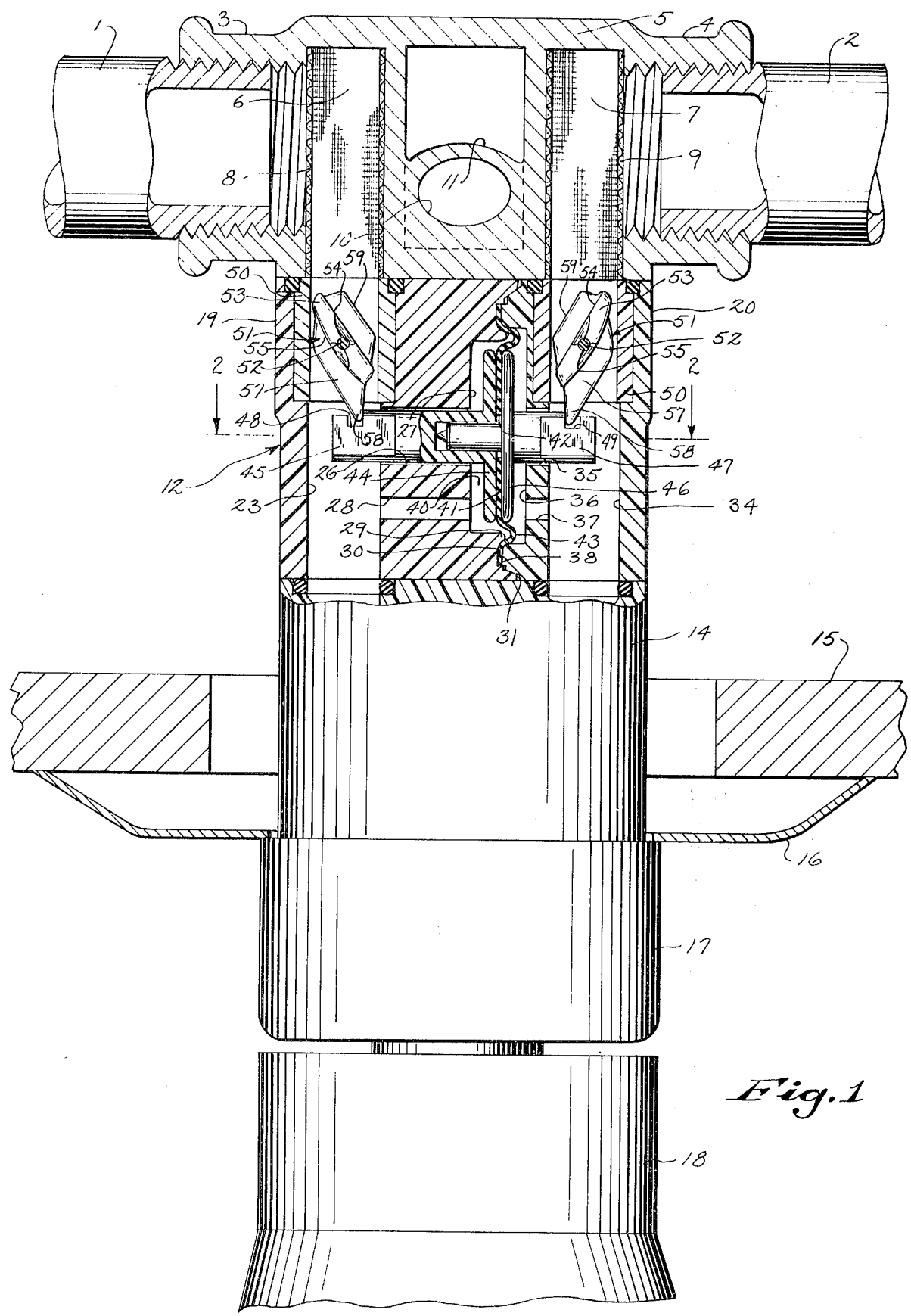
FIG. 1 is a fragmentary view of a shower fitting that includes a pressure balancing valve of the present invention, such valve being shown in longitudinal cross section.

Referring to FIG. 1, there is shown a fitting for controlling the flow of water to a shower and tub. Hot and cold water supply lines 1 and 2 are screwthreaded into a pair of opposed sockets 3 and 4 extending from a manifold 5. The sockets 3 and 4 lead into a pair of water delivery passages 6 and 7 formed within the manifold 5, and snugly seated within these passages 6 and 7 are cylindrical filtering strainers 8 and 9 for screening out sediment from the water flowing therethrough. Within the manifold 5 is an obliquely extending mixed water duct 10 that leads into an outlet 11 that communicates with the shower head and tub that are serviced by the fitting of FIG. 1.

A pressure balancing valve, generally identified by the numeral 12, is connected at its inlet, or upstream end to the lower face of the manifold 5 by means of a set of three bolts 13 shown in FIG. 2. The outlet, or downstream end of the valve 12 is fixed to and sealed against an adapter 14 which extends through an opening in a wall 15, and a conventional single handle mixing valve 17 is mounted upon the outer face of the adapter 14. An escutcheon plate 16 surrounds the adapter 14, and the mixing valve 17 is provided with a manually engageable handle 18 that is manipulated to control the mixing of the hot and cold water streams and in some cases the volume of water flow through the fitting.

The pressure balancing valve 12 is used for the usual purpose of maintaining the proportioned output of the two input streams, as set by the mixing valve 17, and this is accomplished by equalizing the pressures of the hot and cold water on the downstream side of the pressure balancing valve irrespective of pressure variations that may occur in the supply lines 1 and 2.

Figure 7:
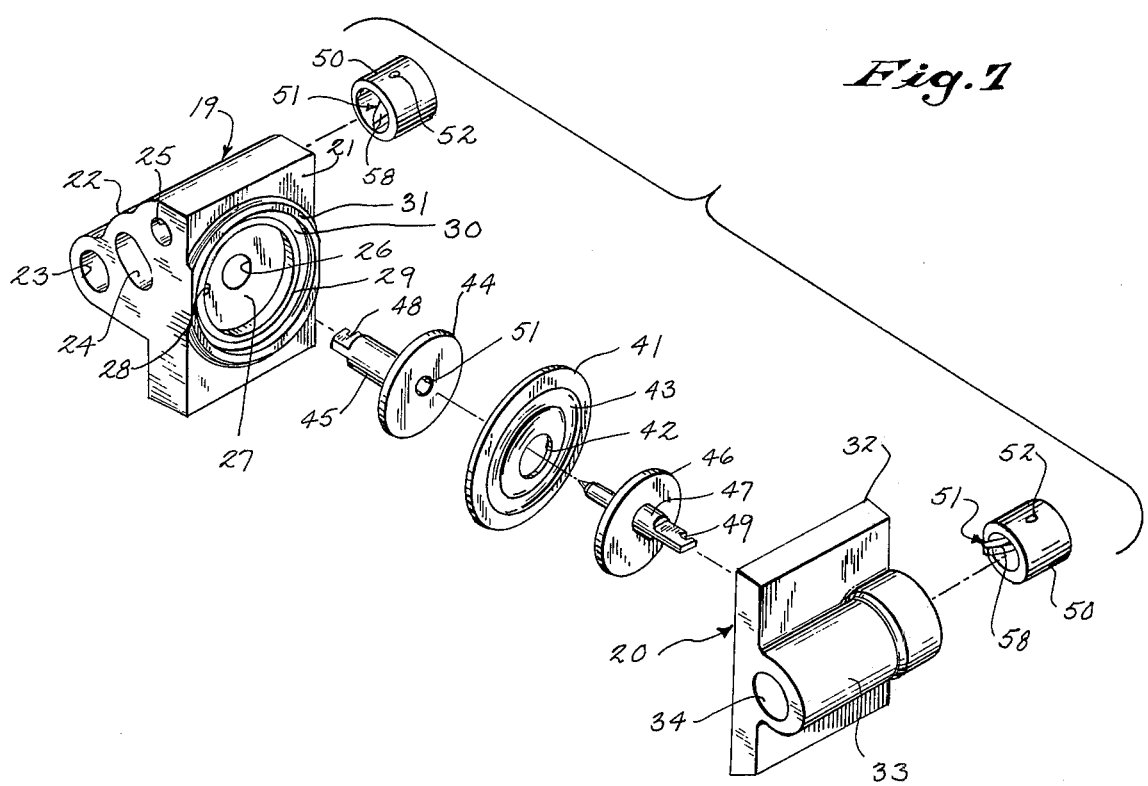
FIG. 7 is an exploded view of the pressure balancing valve shown in FIG. 1.

This valve 12, as seen in FIGS. 1, 2 and 7, includes a two-piece, molded plastic body that comprises a hot water section 19 and a cold water section 20. The hot water section 19 has a rectangular base 21 integrally formed with a shoulder 22 through which passes a hot water duct 23. FIG. 1 shows the duct 23 in alignment with the inlet passage 6, and as shown in FIG. 7 the shoulder 22 is also formed with a mixed water outlet duct 24. This outlet duct 24 passes mixed hot and cold water from the mixing valve 18 to the duct 10 in the manifold 5. A bolt receiving opening 25 runs through a margin of the rectangular base 21 and receives one of the bolts 13 for securing the elements of the fitting in position.

A guideway 26 in the form of a circular, cylindrical opening extends transversely from the hot water duct 23 into a circular depression 27 centrally located in the face of the rectangular base 21. As particularly shown in FIG. 1, a pressure canal 28 extends parallel to the guideway 26 and also connects between the hot water duct 23 and the circular depression 27. As best shown in FIG. 2, a raised lip 29 encircles and forms the periphery of the circular depression 27. Radially to the immediate outside of the lip 29 is a shallow, ribbed circular diaphragm seat 30, and concentric with this seat 30 is an encircling rib 31 used to facilitate assembly of the two-piece plastic body.

The cold water section 20 includes a rectangular base 32 that matches the base 21. The section 20 also has a barrel 33 through which passes a cold water duct 34. As shown in FIG. 1, the cold water duct 34 is in alignment with the cold water passage 7. A short guideway 35 leads off of the duct 34 which is in alignment with the guideway 26 of the hot water section 19. This guideway 35 enters upon the center of a second circular depression 36 formed in the face of the base 32, such second depression 36 being diametrically larger than the depression 27, so as to receive and encompass the raised lip 29. A ribbed flat, circular diaphragm seat 38 encircles the depression 36, and an annular trough 39 lies radially outside the seat 38. This trough 39 receives the rib 31 of the hot water section 19 for making an assembly of the parts. To complete the cold water section 20, there is a second pressure canal 37 lying parallel to the short guideway 35 to provide a fluid entrance from the cold water duct 34 into the circular depression 36.

The composite body of the pressure balancing valve 12 is formed by the mating union of the hot and cold water sections 19 and 20, and they are ultrasonically welded together in the vicinity of the interfitting rib 31 and trough 39. Alternatively, the sections 19 and 20 could be secured by nut and bolt assemblies, or some other suitable fastening agents.

Upon joining of the hot and cold water sections 19 and 20, the raised lip 29 on the base 21 fits within the circular depression 36 of the cold water base 32, and the two circular depressions 27, 36 of the two bases 21, 32 define a cavity 40 which is in communication with both of the hot and cold water ducts 23, 34.

When the composite body is formed by ultrasonic welding the two sections 19, 20 together a diaphragm assembly is inserted within the body. This assembly includes a circular, resilient diaphragm 41 of a suitable elastomer material which is tightly clamped along its periphery between the seats 30, 38 of the bases 21 and 32. The diaphragm 41 has a central opening 42 and is constructed inwardly of its periphery with an undulation, that may be a sinuous fold 43 extending transverse of the general plane of the diaphragm 41. One end of the undulation 43 freely rolls around the raised lip 29 and lies in the edge of the depression 36 so that it may rock back and forth without any undue stress on the diaphragm material. This undulation 43 enables the diaphragm 41 to be particularly responsive to differentials of pressure between its opposite sides, and contributes to the sensitivity of the pressure balancing valve 12. Preferably, the diaphragm 41 is constructed of a Dacron fabric elastomer, which is resilient, readily compliant, and yet sufficiently durable to withstand continuous use, but other suitable materials may also be employed. The dimensions of the diaphragm undulation 43 and the circular depressions 27, 36 are chosen so that the diaphragm undulation 43 is virtually completely supported at the end of the stroke of travel.

A flat hot water pressure plate 44 of circular configuration lies against the hot water side of the diaphragm 41, and covers most of the diaphragm area inward of the undulation 43. A shaft 45 extends normal from the plate 44 through the guideway 26 into the hot water duct 23. Positioned against the cold water side of the diaphragm 41, radially inward of the undulation 43, is a circular cold water pressure plate 46 that is similarly joined perpendicular to a shaft 47 which projects through the guideway 35 into the cold water duct 34. The shaft 47 extends through the central opening 42 of the diaphragm 41 and is received within an opening formed in the pressure plate 44 and shaft 45, where it is ultrasonically welded, or otherwise secured. The shafts 45, 47 thus define a push rod extending transverse to the pressure plates 44 and 46 and the diaphragm 41, and the central, flat area of the diaphragm 41 is sandwiched tightly between the plates 44, 46. The outer ends of the shafts 45, 47 are each formed with a notch 48, 49 for connecting with butterfly vanes to be described. Thus, the diaphragm 41 is interposed within a pressure plate linkage comprised of the pressure plates 44, 46 and the shafts 45, 47 so that a deflection of the diaphragm 41 affords a simultaneous axial shifting of the associated pressure plate linkage. The movable assembly of the diaphragm 41, the pressure plates 44, 46 and shafts 45, 47 together with the cavity 40 and its porting may aptly be called a pressure sensor.

Referring now to FIGS. 1 and 7, identical, circular, cylindrical valve sleeves 50 are inserted into each of the upstream ends of the hot and cold water ducts 23, 34. The central opening of each sleeve 50 is slightly smaller than the diameter of the succeeding downstream length of the associated ducts 23, 32, and the diameter of the strainers 8, 9, so that turbulence of fluid flow is minimized. The slight reduction prevents the strainers from fouling the butterflies and permits for removal of the sleeves. The separate sleeves 50 permit for greater control over the diameter of their openings, than if they were an integral part of the halves 19, 20. They also have a loose fit, so they can swell with any moisture absorption without any warpage of their internal, circular cylindrical openings.

A butterfly, or flapper, 51 is pivotably mounted by a pivot pin 52 within each sleeve 50 to thereby present a butterfly type valve. Such type of valves are usually characterized by a vane that pivots about an axis crosswise of the direction of fluid flow, and in the embodiment shown herein the vane is of a rather complex configuration.

Referring to FIGS. 1 and 3–6, each of the butterflies 51 is molded in order to economically achieve the desired configuration, and each has a vane 53 that receives the associated pivot pin 52. Each vane 53 lies obliquely in its associated sleeve 50, and has a generally elliptical, flat, upstream face 54. A bowed, elliptical, downstream face 55 forms the opposite side of the vane 53, and as particularly shown in FIG. 4 the bowed shape of the downstream face 55 causes the thickness of the vane 53 to vary. The vane 53 is thickest at its virtual center, where it receives the pin 52, and it tapers, or narrows, toward the top and bottom edges. This produces a bowed median line 56, such as shown in FIG. 4, and also a corresponding bowed "line of effective contact" about the vane periphery which comes into closest proximity to the inside surface of the associated sleeve 50 when the butterfly 51 moves to its closed position.

Peripheral portions on each side of the vane 53 are shaved adjacent the pin position to accommodate for the thickness fo the vane 53 when it moves toward closed positions. A toothlike projection 57 extends from the downstream side of the vane 53 that is oriented normal to the axis of butterfly pivot. The projection 57 has a nose 58 that engages within a notched end 48 or 49 of the push rod made up of the shafts 45, 47. On the upstream side of the butterfly vane 53 is a rib 59 which is coplanar with the toothlike projection 57. The rib 59 functions with vane 53 as a stiffener for the butterfly 51.

In operation, hot and cold water is delivered through the supply lines 1 and 2 and manifold 5 into the ducts 23 and 34 of the pressure balancing valve 12. If the mixing valve 18 is closed, so that there is no fluid flow, and if the fluid pressures in the inlet lines 1 and 2 are equal, then these line pressures will be transmitted through the pressure canals 28, 37 to opposite sides of the diaphragm 41 and place the diaphragm in a "neutral" position, such as shown in FIG. 1. When the mixing valve 18 is opened and manipulated to a desired position calling for some mix of hot and cold water the line pressures will be substantially present at the pressure canals 28, 37 for the reason throttling takes place in the downstream mixing valve 18. The diaphragm 41 will then continue to remain in the "neutral" position illustrated.

With the mixing valve 18 open for some selected mixing of hot and cold water, in the event of a pressure deviation in either of the hot or cold lines 1, 2 there will be a corresponding pressure change on the downstream side of the respective butterfly 51. The forces acting upon the diaphragm 41 will become unbalanced, so as to cause a shift of the pressure sensor assembly. The rod-like linkage formed of the shafts 45, 47 will move, and through the connections with the noses 58 pivot the butterflies 51 until the pressures on their downstream sides become equal. This displacement causes the butterfly 51 to close on the greater pressure side, and the other butterfly 51 to open on the lower pressure side, so that fluid flow is reduced on the greater pressure side and increased on the lower pressure side. As a result, preset proportioned flow rates of hot and cold water are maintained, so that the resulting mixture temperature will remain substantially constant.

The fluid forces of water flowing through the butterfly valves exert pressures upon the butterflies 51 that modify the forces acting in the cavity 40 upon the diaphragm 41. These forces are rather complex, entailing impingement forces on the upstream vane faces 54, back pressures on the bowed downstream vane faces 55, and peripheral forces. The net force, on one butterfly 51, however, largely cancels the net force on the other butterfly 51 by acting in opposition through the rod-like linkage of the shafts 45, 47. Also, when the diaphragm 41 is displaced from its neutral position the net force of the butterflies 51 transmitted to the diaphragm 41 is in opposition to internal stresses of the diaphragm. As a result, the diaphragm 41 is more sensitive for governing the operation of the device. A subsequent advantage is that the size of the diaphragm may be reduced without undue loss of sensitivity of control.

The butterflies 51 are designed to develop a net closing force whenever pivoted into a nearly closed position with its associated sleeve 50. The bowed median line 56 about the periphery of a butterfly 51 approximates a line of contact that would occur upon full closing of a butterfly and by extending the line for a greater length on the side of the pivot pin 52 upon which closing forces are developed, i.e. the upstream side, in contrast to the opposite side, i.e. the downstream side, a net closing force can be developed. This causes a butterfly to fully close, or nearly fully close, when brought up to the closing position. There is sufficient play between a butterfly 51 and the rod-like linkage to allow the butterfly 51 to move closed when it nears this position. This characteristic of being self closing aids shut-off whenever water flow ceases, or drops drastically, in the opposite line. Undesirable discharge of only cold or hot water, when there is a failure of flow in the other line, is thus minimized.

Figure 8:
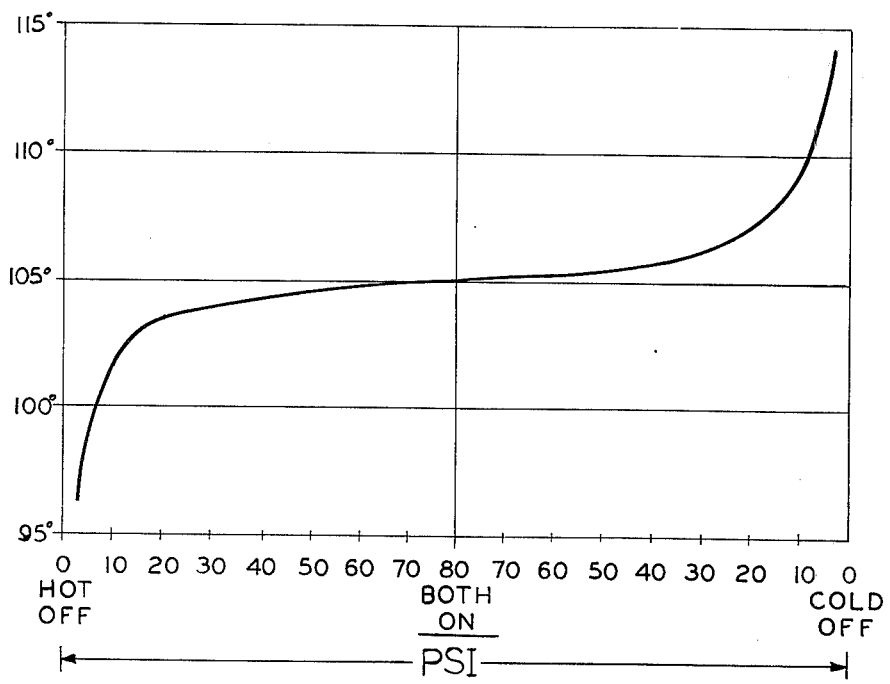
FIG. 8 is a graph for the pressure balancing valve portraying outlet temperature over a range of supply pressure variation.

Utilization of the pressure balancing valve 12 in a typical tub-shower installation provides good regulation of a selected temperature of mixed hot and cold water over a wide range of supply line pressures. As seen in the graph of FIG. 8, a selected mixture temperature of 105°F was substantially preserved over a line pressure range of between 20 and 80 psi. The point 80 on the abscissa is for 80 psi in both hot and cold lines. The range 0 to 80 on the left of the point 80 is for hot water pressure of such valves while 80 psi is held for the cold water line. The range 80 to 0 on the right of the graph is for a similar cold pressure range while the hot is held constant at 80 psi. Upon approaching shut-off in the hot or cold line, there is but a minor deviation of only 8°F from the desired mixture temperature of 105°F, although the ungraphed total volume flow will, of course, have materially decreased. The objection of temperature stability and sensitive control together with a safe, comfortable, operation is achieved.

The pressure balancing valve 12 is also notable for the compact size and undulated structure of the diaphragm 41, wherein a small force differential will cause a full axial shift of the pressure plate linkage to have a well regulated temperature control. The design allows for a wide margin of clearance of the pressure sensor parts to reduce sedimentation. A self-cleaning aspect is enhanced by the use of a glass-filled, acetal copolymer, such as, Celcon GC-25, in the construction of the two-piece housing, the pressure plate linkage, and the butterfly valves. The Celcon copolymer material not only maintains its integrity in the presence of high temperatures, but has a smoothness and lubricity which resists scale and sediment buildup. Further, the use of the butterfly design minimizes fluid turbulence and water hammer problems, and provides self-cleaning by presenting oblique surfaces to water flow which are continuously washed. The self-closing feature of the butterflies also improves shutoff characteristics when there is a loss of pressure in one of the input lines.

I claim:
1. A pressure balancing valve comprising:
   a body having two spaced, substantially straight fluid ducts, a cavity intermediate the ducts, guideways leading from each duct into the cavity that are transverse to the ducts, and pressure canals leading from each duct into the cavity that are also transverse to the ducts;
   a pressure sensor including a flexible pressure responsive member dividing the cavity that is mounted for axial movement within said guideways in a direction transverse to said ducts and which extends into each of said fluid ducts; and
   a pair of butterflies, each positioned in one of said fluid ducts and cooperatively engaged with said pressure sensor to be moved upon axial movement thereof, such butterflies being upstream from said pressure canals.

2. A valve as in claim 1, wherein said pressure responsive member is a diaphragm held about its periphery that has an undulation in its surface extending transverse of the general plane thereof and located to the inside of the held periphery, the undulation enabling said diaphragm to respond to pressure differential on its opposite sides.

3. A pressure balancing valve comprising:
 a body having two spaced fluid ducts, a cavity intermediate the ducts, guideways leading from each duct into the cavity, and pressure canals leading from each duct into the cavity;
 a pressure sensor including a flexible pressure responsive member dividing the cavity that is mounted for axial movement within said guideways and which extends into each of said fluid ducts; and
 a pair of butterflies, each positioned in one of said fluid ducts and cooperatively engaged with said pressure sensor to be moved thereby, such butterflies being upstream from said pressure canals and each having a pivoted vane that varies in thickness to present a periphery that has a longer line of contact along its portion upstream from the pivot than along its portion downstream from the pivot.

4. A pressure balancing valve comprising:
 a body having two spaced fluid ducts, a cavity intermediate the ducts, guideways leading from each duct into the cavity, and pressure canals leading from each duct into the cavity,
 a pressure sensor including a flexible pressure responsive member dividing the cavity that is mounted for axial movement within said guideways and which extends into each of said fluid ducts;
 a pair of butterflies, each positioned in one of said fluid ducts and cooperatively engaged with said pressure sensor to be moved thereby, such butterflies being upstream from said pressure canals; and
 a cylindrical sleeve inserted in each fluid duct which mounts and houses one of said butterflies.

5. A pressure balancing valve comprising:
 a body having two spaced apart, substantially parallel fluid ducts defined therein;
 an intermediate cavity formed in said body and communicating with said fluid ducts;
 a pressure sensor linkage mounted for shifting movement within said cavity in a direction transverse to said ducts, said pressure sensor linkage having ends extending into said fluid ducts;
 a resilient diaphragm extending across said intermediate cavity, that lies in a plane substantially parallel to said ducts and connected to said linkage to shift the same; and
 a pair of butterflies, each being positioned in a fluid duct and in connection with said pressure sensor linkage, whereby diaphragm movement shifts said linkage to operate said butterflies.

6. A valve as in claim 5, wherein said diaphragm is responsive to the pressure differential on its opposite sides, said communication of the cavity with said ducts introduces duct pressures into said cavity, and said butterflies are located in said ducts upstream from said communication between said ducts and cavity.

7. A pressure balancing valve comprising:
 a body having two fluid ducts extending therethrough, each duct having an upstream and downstream end;
 a cavity formed within said body and having a guideway communicating between said cavity and each fluid duct;
 a resilient diaphragm extending across said cavity;
 a rod-like pressure sensor linkage axially movable within said cavity and said guideways which has two pressure plates disposed on opposite sides of said diaphragm and having ends extending into said fluid ducts;
 pressure canals connecting said cavity and interconnecting said fluid ducts, said canals being disposed toward the downstream ends of said fluid ducts; and
 a pair of butterflies, each being positioned in a duct toward the upstream end, and connected to one of said ends of said pressure sensor, whereby said diaphragm converts pressure differential into positional displacement by axially shifting said pressure sensor linkage to pivot said butterflies, such that downstream pressures are maintained substantially equal.

8. A pressure balancing valve as recited in claim 7 wherein each said butterfly is pivotably mounted within a sleeve and includes a vane having a line around its outer periphery in closest proximity to said sleeve which defines a band of contact, said band of contact being longer and at an angle of lesser deviation from said fluid duct on the upstream side of said vane than the downstream side to produce a closing torque on the upstream side of vane when the butterfly is moved towards a closing position.

9. A pressure balancing valve as recited in claim 8 wherein each said vane has an upper surface and a bowed bottom surface which are generally elliptical in shape.

10. A pressure balancing valve as recited in claim 9 wherein said body, said pressure sensor linkage, said sleeves and said butterflies are constructed from an acetal copolymer.

11. A pressure balancing valve as recited in claim 7 wherein said body comprises a first section having one of said fluid ducts defined therethrough and a second section having the other of said fluid ducts defined therethrough and there is a mixed water outlet duct formed throughout said first section which extends parallel to both said fluid ducts.

12. A pressure balancing valve comprising:
 a body having two spaced fluid ducts that have straight runs for fluid flow therethrough;
 a cavity intermediate said fluid ducts;
 a canal leading from the straight run of each of said ducts into said cavity and extending crosswise to said fluid ducts;
 a pressure sensor including a flexible pressure responsive member dividing said cavity that is mounted for axial movement in a direction transverse to said fluid ducts and which extends into each of said fluid ducts; and
 a pair of butterflies each positioned in the straight run of one of said fluid ducts and cooperatively engaged with said pressure sensor to be moved upon axial movement thereof.

13. A valve as in claim 12, wherein each of said butterflies is mounted for pivotal movement within one of said fluid ducts and has a projection extending from its downstream side which is normal to the axis of butterfly pivot and which engages said pressure sensor.

* * * * *